(12) United States Patent
Gangadharan et al.

(10) Patent No.: US 10,805,144 B1
(45) Date of Patent: Oct. 13, 2020

(54) MONITORING INTERACTIONS BETWEEN ENTITIES IN A NETWORK BY AN AGENT FOR PARTICULAR TYPES OF INTERACTIONS AND INDEXING AND ESTABLISHING RELATIONSHIPS OF THE COMPONENTS OF EACH INTERACTION

(71) Applicant: Cisco Technology, Inc., San Jose, CA (US)

(72) Inventors: Binod Pankajakshy Gangadharan, Bangalore (IN); Prerana Singhal, Bangalore (IN); Avinash Kolluru, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/444,242

(22) Filed: Jun. 18, 2019

(51) Int. Cl.
*H04L 12/24* (2006.01)
*G06F 16/23* (2019.01)
*H04L 12/26* (2006.01)

(52) U.S. Cl.
CPC ...... *H04L 41/0631* (2013.01); *G06F 16/2379* (2019.01); *H04L 41/0654* (2013.01); *H04L 41/16* (2013.01); *H04L 43/028* (2013.01)

(58) Field of Classification Search
CPC ... H04L 41/0631; H04L 43/028; H04L 41/16; H04L 41/0654; G06F 16/2379
See application file for complete search history.

(56) References Cited

U.S. PATENT DOCUMENTS

| | | | |
|---|---|---|---|
| 6,243,746 B1 * | 6/2001 | Sondur | G06F 11/327 709/220 |
| 6,271,845 B1 * | 8/2001 | Richardson | H04L 41/0893 715/764 |
| 6,292,099 B1 * | 9/2001 | Tse | H04L 41/0631 340/3.1 |
| 6,339,832 B1 * | 1/2002 | Bowman-Amuah | G06F 9/542 710/266 |
| 6,349,333 B1 * | 2/2002 | Panikatt | H04L 41/0213 709/223 |
| 6,393,386 B1 * | 5/2002 | Zager | H04L 41/0233 370/254 |
| 6,434,568 B1 * | 8/2002 | Bowman-Amuah | G06F 16/289 |

(Continued)

*Primary Examiner* — Daniel C. Murray
(74) *Attorney, Agent, or Firm* — Behmke Innovation Group LLC; James M. Behmke; Johnathon P. Western

(57) ABSTRACT

In one embodiment, a controller instructs agent processes to monitor for instances of particular types of interactions, each defined by a type of context entity within an interaction instance and one or both of a type of head entity sourcing an interaction instance and a type of tail entity as a destination of an interaction instance. The controller may then receive interaction objects from plurality of agent processes, each containing an identification of a respective interaction instance matching one of particular types of interactions, each respective interaction instance identifying, as components of each respective interaction instance, a particular context entity and one or both of a particular head entity and a particular tail entity. The controller may then index the components of each respective interaction instance, establish relationships between the indexed components according to each respective interaction instance, store the indexed components and established relationships, and generate reports based thereon.

20 Claims, 17 Drawing Sheets

(56) References Cited

U.S. PATENT DOCUMENTS

| | | | | |
|---|---|---|---|---|
| 6,456,306 B1* | 9/2002 | Chin | H04L 41/0213 | 709/224 |
| 6,556,659 B1* | 4/2003 | Bowman-Amuah | H04L 12/14 | 370/252 |
| 6,611,867 B1* | 8/2003 | Bowman-Amuah | H04L 41/046 | 709/218 |
| 6,625,648 B1* | 9/2003 | Schwaller | H04L 41/0213 | 370/230 |
| 6,714,976 B1* | 3/2004 | Wilson | H04L 29/06 | 709/224 |
| 6,728,688 B1* | 4/2004 | Hirsch | H04L 41/0213 | 340/506 |
| 6,865,591 B1* | 3/2005 | Garg | G06F 11/1482 | 709/201 |
| 7,299,277 B1* | 11/2007 | Moran | H04L 41/5022 | 370/230 |
| 7,409,676 B2* | 8/2008 | Agarwal | G06F 11/008 | 707/999.1 |
| 7,428,723 B2* | 9/2008 | Greene | G06Q 10/063112 | 717/103 |
| 7,631,222 B2* | 12/2009 | Hasan | H04L 41/0631 | 714/26 |
| 7,769,847 B2* | 8/2010 | Lewis | H04L 41/00 | 709/224 |
| 7,836,156 B1* | 11/2010 | Ou | H04L 41/12 | 709/220 |
| 7,853,611 B2* | 12/2010 | Friedlander | G06F 16/24565 | 707/780 |
| 7,912,055 B1 | 3/2011 | Kleers et al. | | |
| 8,180,718 B2* | 5/2012 | Bethke | G06F 11/3604 | 706/45 |
| 8,356,288 B2 | 1/2013 | Neufeld et al. | | |
| 8,447,719 B2* | 5/2013 | Bethke | G06N 5/04 | 706/49 |
| 8,635,496 B2* | 1/2014 | Hidaka | G06F 11/0706 | 714/26 |
| 8,769,339 B2* | 7/2014 | Sonoda | H04L 41/064 | 714/26 |
| 8,976,955 B2* | 3/2015 | Liberman Ben-Ami | H04M 3/5191 | 379/265.09 |
| 9,098,542 B2* | 8/2015 | Prahlad | G06F 16/24575 | |
| 9,154,397 B2* | 10/2015 | Reynolds | H04L 43/0876 | |
| 9,239,887 B2* | 1/2016 | Johnston | H04L 45/00 | |
| 9,313,089 B2* | 4/2016 | Goerge | H04L 41/046 | |
| 9,432,278 B2 | 8/2016 | Kaler et al. | | |
| 9,612,892 B2* | 4/2017 | Schimmelpfeng | G06F 11/079 | |
| 9,619,984 B2* | 4/2017 | Donovan | G08B 13/19645 | |
| 9,705,817 B2* | 7/2017 | Lui | H04L 41/046 | |
| 9,722,900 B2* | 8/2017 | Reynolds | H04L 43/028 | |
| 10,043,102 B1* | 8/2018 | Goenka | G06F 16/583 | |
| 10,162,696 B2* | 12/2018 | Kogan-Katz | G06F 11/076 | |
| 10,250,755 B2* | 4/2019 | Richards | H04L 47/10 | |
| 10,270,668 B1* | 4/2019 | Thompson | H04L 41/5009 | |
| 10,324,773 B2* | 6/2019 | Wing | G06Q 10/10 | |
| 10,387,448 B2* | 8/2019 | Xu | G06F 11/3409 | |
| 10,402,255 B1* | 9/2019 | Niyogi | G06F 11/0709 | |
| 10,454,955 B2* | 10/2019 | Schulman | H04L 63/1425 | |
| 10,459,780 B2* | 10/2019 | Pasupuleti | H04L 41/5009 | |
| 10,462,031 B1* | 10/2019 | Nataraj | H04L 43/0888 | |
| 10,462,689 B2* | 10/2019 | Condeixa | H04L 43/06 | |
| 10,469,346 B2* | 11/2019 | Maroulis | H04L 41/0631 | |
| 10,536,505 B2* | 1/2020 | Pasupuleti | H04L 41/5019 | |
| 10,587,460 B2* | 3/2020 | Donovan | H04N 7/181 | |
| 10,650,079 B2* | 5/2020 | Jindal | G06F 16/972 | |
| 2001/0013107 A1* | 8/2001 | Lewis | H04Q 3/0095 | 714/47.3 |
| 2001/0014886 A1* | 8/2001 | Ross | H04M 3/08 | 706/45 |
| 2002/0120727 A1* | 8/2002 | Curley | H04L 41/12 | 709/223 |
| 2003/0005021 A1* | 1/2003 | Shah | G06F 11/3404 | 718/1 |
| 2003/0046582 A1* | 3/2003 | Black | H04L 63/1408 | 726/23 |
| 2003/0061550 A1* | 3/2003 | Ng | G06F 11/3664 | 714/45 |
| 2003/0167406 A1* | 9/2003 | Beavers | G06F 11/0709 | 726/22 |
| 2003/0195959 A1* | 10/2003 | Labadie | H04L 69/329 | 709/224 |
| 2004/0064499 A1* | 4/2004 | Kasravi | H04L 12/1854 | 709/202 |
| 2005/0240835 A1* | 10/2005 | Dragnea | H04L 41/046 | 714/47.2 |
| 2006/0116853 A1* | 6/2006 | Rappaport | H04W 16/18 | 702/182 |
| 2009/0313198 A1* | 12/2009 | Kudo | H04L 41/069 | 706/47 |
| 2010/0106678 A1* | 4/2010 | Pietrek | G06F 11/3495 | 706/54 |
| 2012/0041858 A1* | 2/2012 | Lewis | H04L 41/16 | 705/34 |
| 2013/0311832 A1* | 11/2013 | Lad | H04L 43/08 | 714/37 |
| 2017/0075798 A1* | 3/2017 | Lau | G06F 11/3688 | |
| 2017/0139996 A1* | 5/2017 | Marquardt | G06F 16/951 | |
| 2017/0199727 A1* | 7/2017 | Lau | G06F 3/0484 | |
| 2017/0199806 A1* | 7/2017 | Dahan | G06F 11/3664 | |
| 2017/0200097 A1* | 7/2017 | Lau | G06T 11/206 | |
| 2017/0200098 A1* | 7/2017 | Lau | G06Q 10/0633 | |
| 2017/0243132 A1* | 8/2017 | Sainani | G06N 5/025 | |
| 2017/0366421 A1* | 12/2017 | Dam | H04L 43/50 | |
| 2018/0034715 A1* | 2/2018 | Nagaraju | G06F 16/901 | |
| 2018/0089272 A1* | 3/2018 | Bath | G06F 16/2455 | |
| 2018/0089278 A1* | 3/2018 | Bhattacharjee | G06F 16/278 | |
| 2018/0123922 A1* | 5/2018 | Nataraj | H04L 41/0631 | |
| 2018/0246942 A1* | 8/2018 | Chen | G06F 16/248 | |
| 2018/0276266 A1* | 9/2018 | Diwakar | G06F 11/3006 | |
| 2018/0308001 A1* | 10/2018 | Doddala | H04L 41/16 | |
| 2018/0314576 A1* | 11/2018 | Pasupuleti | G06F 11/3409 | |
| 2018/0316743 A1* | 11/2018 | Pasupuleti | H04L 43/08 | |
| 2019/0034254 A1* | 1/2019 | Nataraj | G06F 11/0754 | |
| 2019/0095478 A1* | 3/2019 | Tankersley | G06F 11/3006 | |
| 2019/0130045 A1* | 5/2019 | Jindal | G06F 15/17331 | |
| 2019/0372868 A1* | 12/2019 | Maroulis | G06F 11/3452 | |
| 2019/0385167 A1* | 12/2019 | Subhedar | H04L 63/1408 | |
| 2020/0026772 A1* | 1/2020 | Wheeler | G06F 16/24578 | |

* cited by examiner

| INTERACTION OBJECT 600 | | | | | | |
|---|---|---|---|---|---|---|
| INTERACTION HEAD 605 | INTERACTION TAIL 610 | UPSTREAM INTERACTION 615 | HEAD MEASUREMENTS 620 | TAIL MEASUREMENT 625 | INTERACTION MEASUREMENTS 630 | INTERACTION CONTEXT 635 | ARBITRARY PROPERTIES 640 |

FIG. 6

MONITORING INTERACTIONS BETWEEN ENTITIES IN A NETWORK BY AN AGENT FOR PARTICULAR TYPES OF INTERACTIONS AND INDEXING AND ESTABLISHING RELATIONSHIPS OF THE COMPONENTS OF EACH INTERACTION

TECHNICAL FIELD

The present disclosure relates generally to computer systems, and, more particularly, to monitoring interactions between entities.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

Said differently, performance monitoring products need to be able to monitor interactions between entities. Monitoring interactions in a custom way for each scenario, however, can be difficult for a number of reasons. For instance, in addition to the cost of implementation and maintenance for such custom monitoring products, it can be difficult to build useful services for root cause analysis (RCA) and Artificial Intelligence for IT Operations (AIOPS) across platforms, since each type of interaction needs to be handled differently, and the many of entities that can be monitored include all different types of hardware devices, software code/threads, applications, virtual endpoints, and so on. That is, interactions are defined differently, can be classified differently, occur differently, are accessed differently (e.g., application programming interfaces, APIs), and so on.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example of an interaction object format in accordance with one or more embodiments described herein;

DESCRIPTION OF EXAMPLE EMBODIMENTS

Overview

Figure 1A:
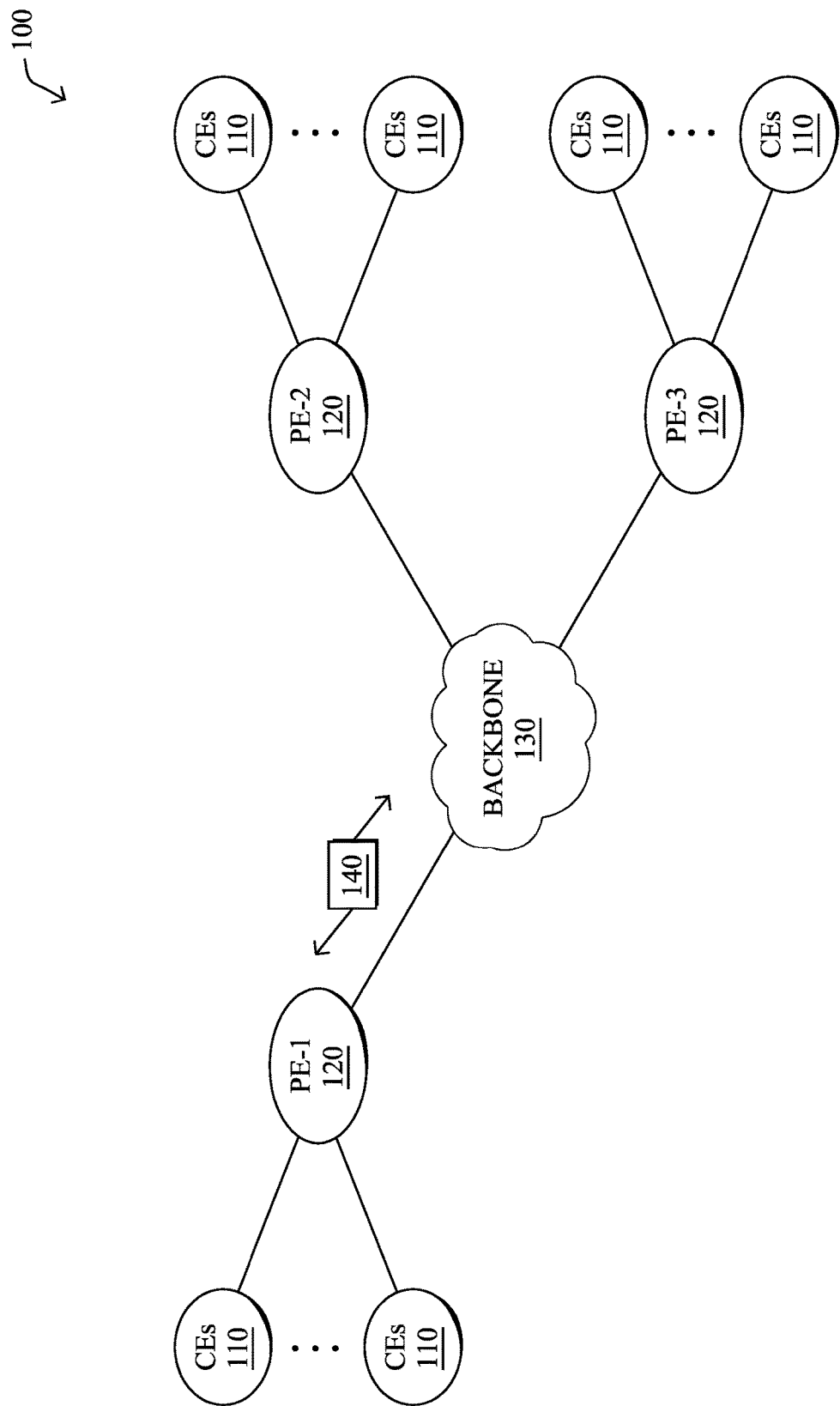
FIGS. 1A-1B illustrate an example computer network.

According to one or more embodiments of the disclosure, a controller instructs a plurality of agent processes in a computer network to monitor for instances of one or more particular types of interactions in the computer network, each type of interaction defined by a type of context entity within an interaction instance and one or both of a type of head entity sourcing an interaction instance and a type of tail entity as a destination of an interaction instance. As such, the controller may then receive a plurality of interaction objects from among the plurality of agent processes, each of the plurality of interaction objects containing an identification of a respective interaction instance matching one of the one or more particular types of interactions, each respective interaction instance identifying, as components of each respective interaction instance, one or both of a particular head entity and a particular tail entity, and optionally a particular context entity. The controller may then index the components of each respective interaction instance, establish relationships between the indexed components according to each respective interaction instance, store the indexed components and established relationships, and generate reports based on the stored indexed components and established relationships, accordingly.

Other embodiments are described below, such as optionally including an identity of an upstream interaction of an interaction instance, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
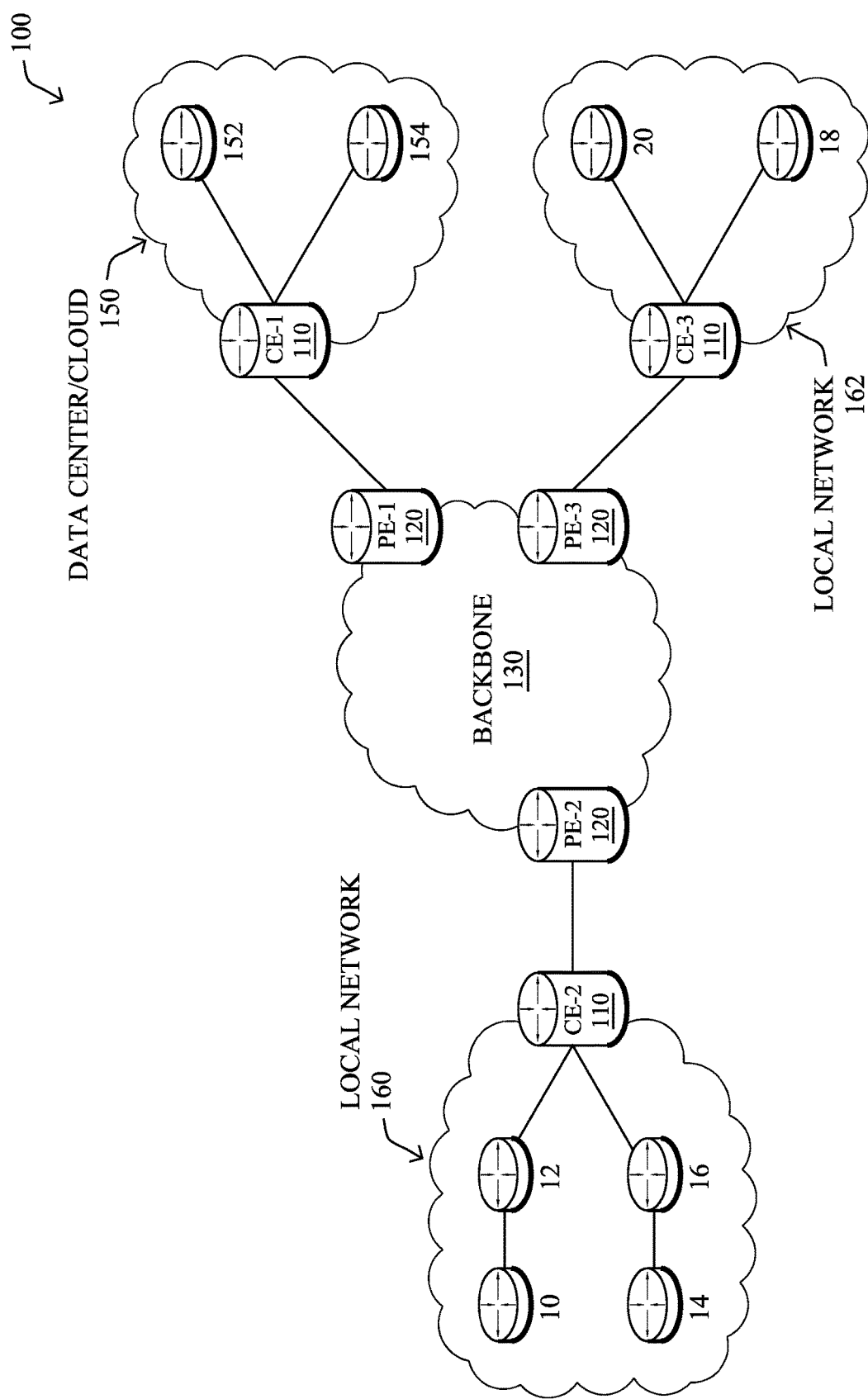

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
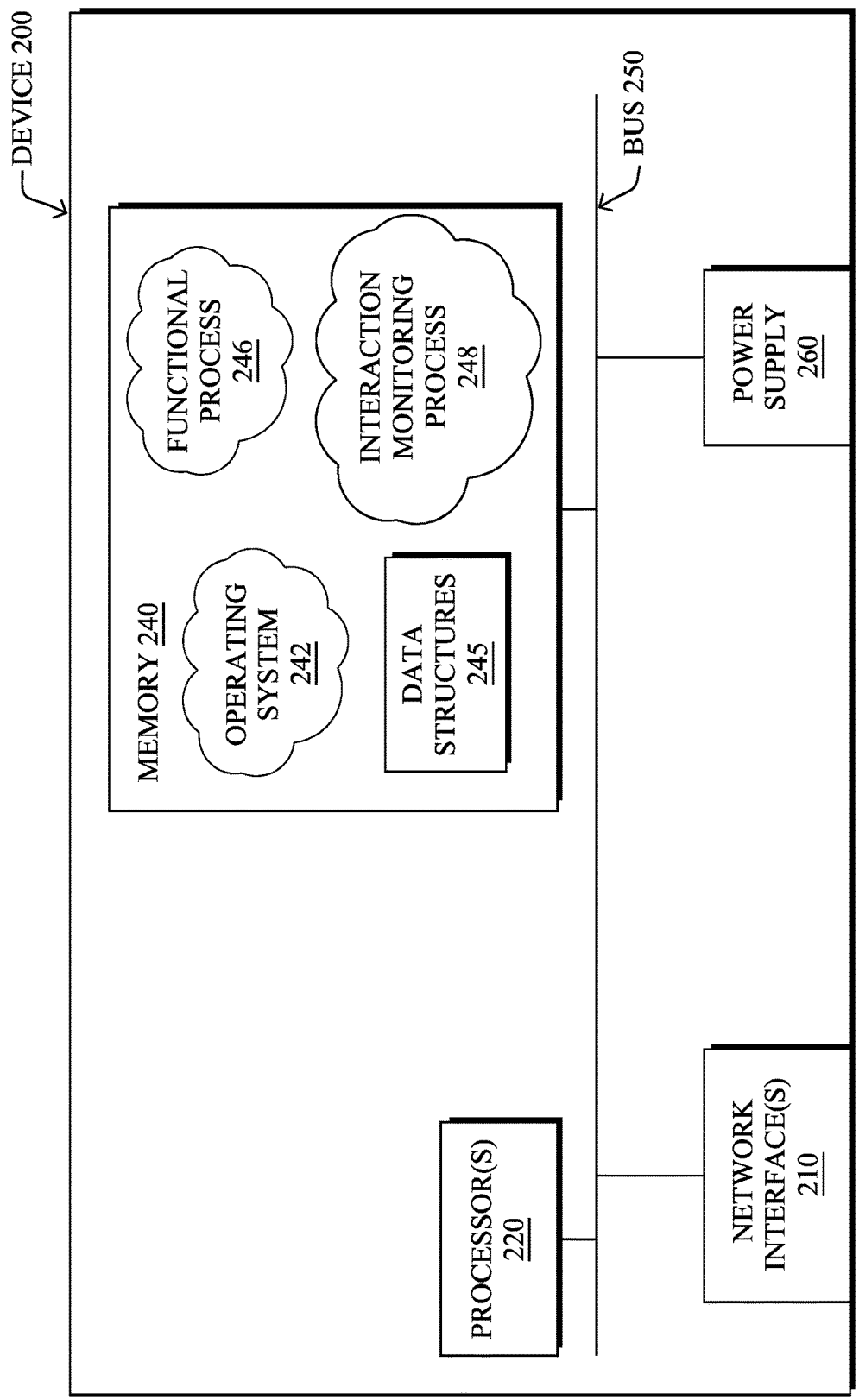
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "interaction monitoring" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Application Intelligence Platform—

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
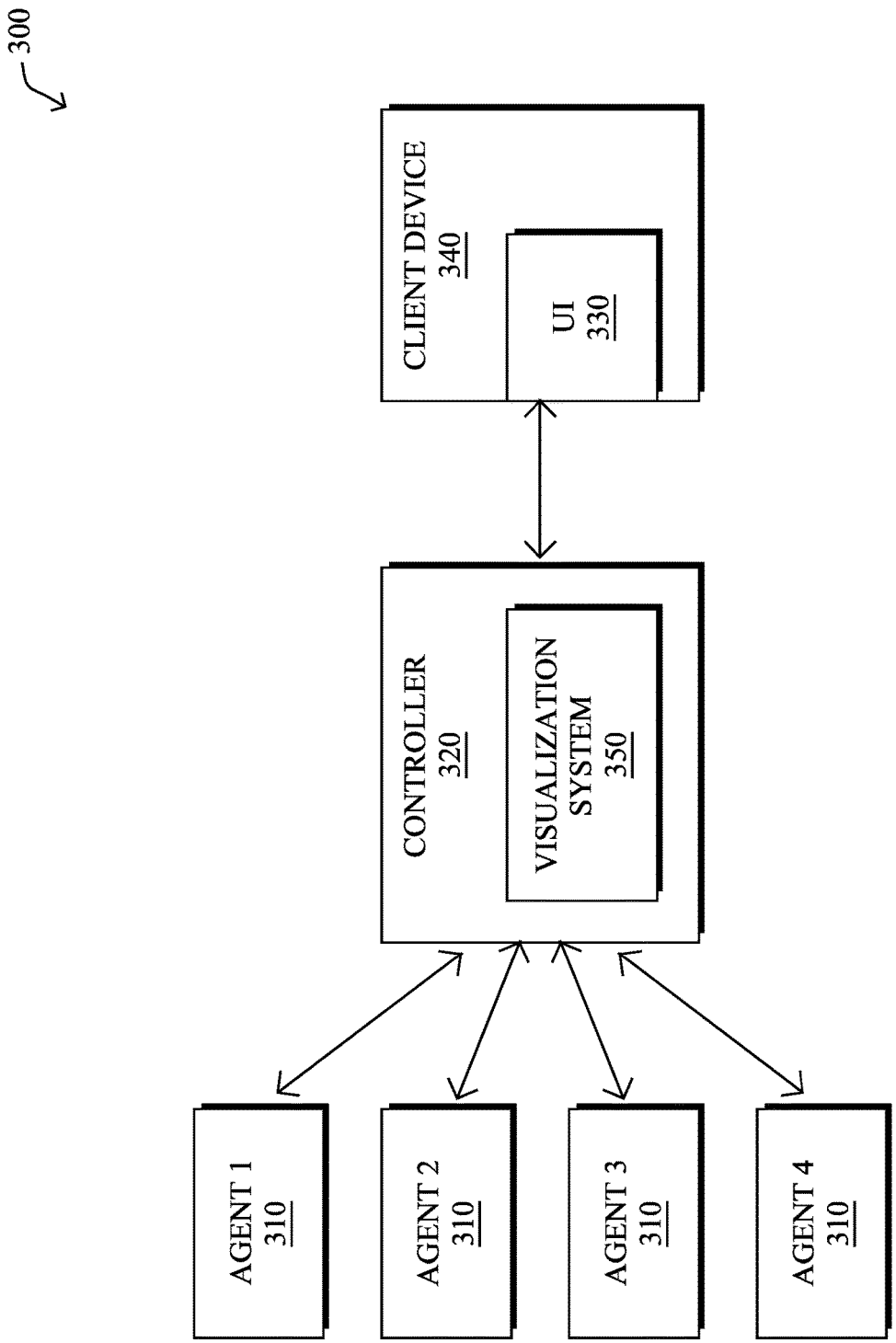
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premises (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
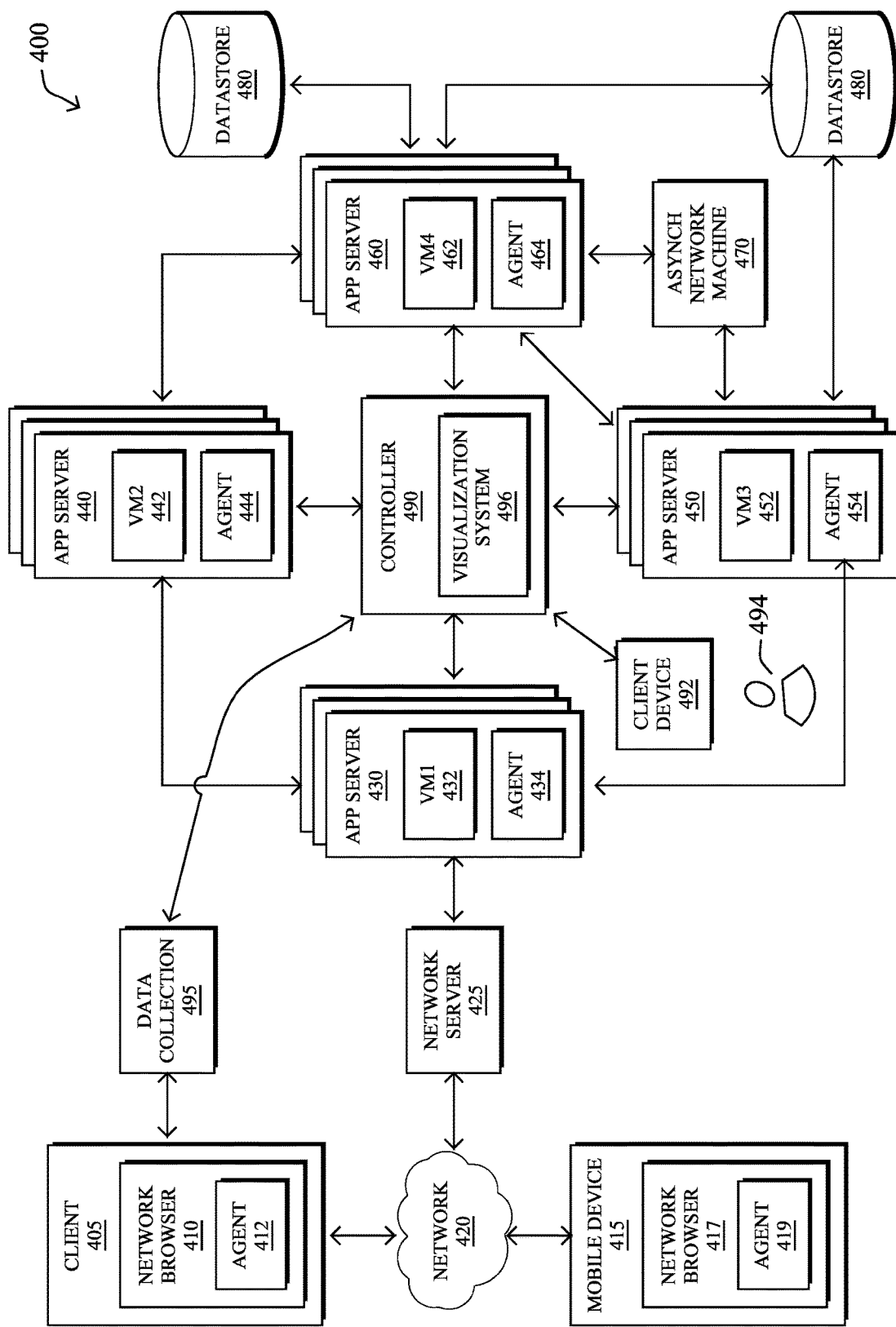
FIG. 4 illustrates an example system for implementing the example application intelligence platform.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 3). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller

490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source).

The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 390 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
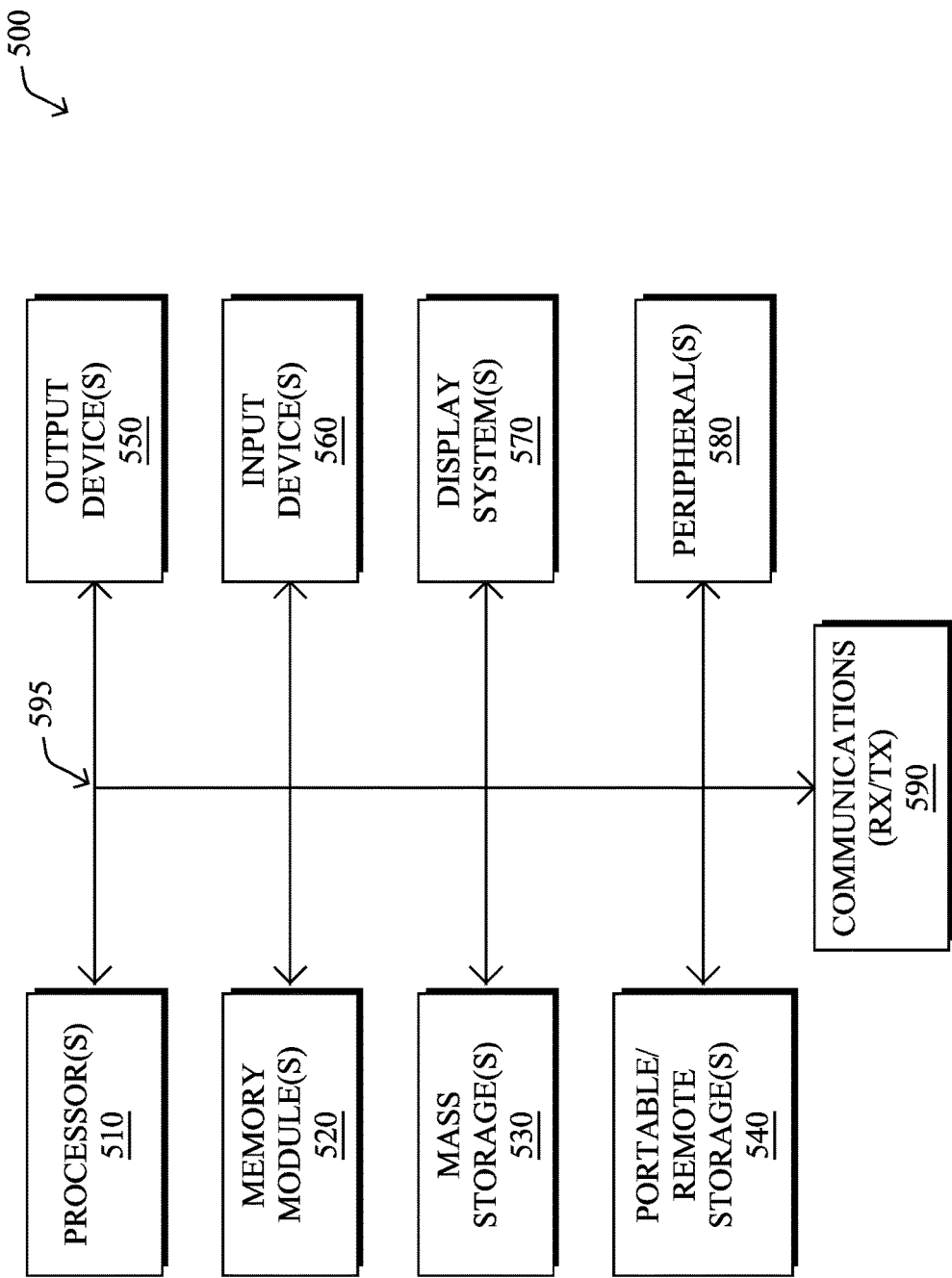
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, a synchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present disclosure for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

—Monitoring Interactions Between Entities—

Web pages may be monitored using various types of Browser Real User Monitoring (BRUM) products (e.g., agents, as described above), which report performance data about the page and its resources, such as JavaScripts (JS), Stylesheets (CSS), images, etc. In particular, Java Script Agents ("JSAgents"), as mentioned above, may be configured to collect and reports performance data about web pages and their resources, such as JS, CSS, images, etc. For instance, the application intelligence platform above has been specifically detailed for coordinating business transactions across devices, tying together different application entities across a tracked business-transaction-based path. However, business transactions are only one specific context of interaction with a generally rigid structure, and web page communication is only one type of interaction.

As mentioned above, performance monitoring products need to be able to monitor all different types of interactions between entities, and not only business transactions, such as, for example:
1. A java application making a Representational State Transfer (REST) invocation to another java application;
2. A network endpoint sending packets to another network endpoint;
3. A consumer application receiving messages from a topic of a message queue;
4. Etc.

Entities could be any hardware or software source or destination of an interaction, including a device, application, queue, server, thread, and so on. Certain entities also have particular relationships with other entities, such as, e.g., a disk in a machine, a server for an app/webpage, etc. Interactions between these entities also presents an unlimited number of combinations and intentions, as an "interaction" is generally anything that enables any two objects/entities (hardware or software) to interact.

In order to completely visualize and understand the operations topology for any particular customer, these disparate entity connections and a wide-range of different metrics need to be determined. As also mentioned above, monitoring interactions in a custom way for each scenario, however, can be difficult for a number of reasons. For instance, in addition to the cost of implementation and maintenance for such custom monitoring products, it can be difficult to build useful services for root cause analysis (RCA) and Artificial Intelligence for IT Operations (AIOPS) across platforms, since each type of interaction needs to be handled differently. That is, interactions are defined differently, can be classified differently, occur differently, are accessed differently (e.g., application programming interfaces, APIs), and so on.

The techniques herein, therefore, provide an abstraction for interactions to allow capturing, tracking, and monitoring interactions in a meaningful manner. That is, current monitoring products monitor particular entities of interest for particular customers and collect particular metrics related to them. However, these entities often interact with each other and hence such interactions are also needed to be monitored. Also, certain entities, interactions, or metrics may not be particularly tracked or monitored by current applications or in a way that the customer wants. The techniques herein thus propose a method and system to model interactions such that a monitoring platform can support interactions in a generic, extensible way.

Specifically, according to one or more embodiments described herein, a controller instructs a plurality of agent processes in a computer network to monitor for instances of one or more particular types of interactions in the computer network, each type of interaction defined by a type of context entity within an interaction instance and one or both of a type of head entity sourcing an interaction instance and a type of tail entity as a destination of an interaction instance. As such, the controller may then receive a plurality of interaction objects from among the plurality of agent processes, each of the plurality of interaction objects containing an identification of a respective interaction instance matching one of the one or more particular types of interactions, each respective interaction instance identifying, as components of each respective interaction instance, one or both of a particular head entity and a particular tail entity, and optionally a particular context entity (and further optionally, an upstream interaction). The controller may then index the components of each respective interaction instance, establish relationships between the indexed components according to each respective interaction instance, store the indexed components and established relationships, and generate reports based on the stored indexed components and established relationships, accordingly.

Operationally, the techniques herein illustratively use an abstracted/generic data-transfer object, referred to herein as an "interaction object", which addresses the needs explained above. FIG. 6 illustrates an example interaction object 600, which generalizes—any—interaction between —any—type of entities, and may comprise the following fields for relevant information:

Interaction Head 605: Type and Identifier of an entity that represents the source of the interaction (this would identify a service, a network endpoint, a message topic, etc.);

Interaction Tail 610: Type and Identifier of an entity that represents the destination of the interaction (this would identify a service, a network endpoint, a message topic, etc.);

Upstream Interaction 615: Type and Identifier of the interaction that triggered this interaction (this would help chain the interactions such that a directed acyclic graph (DAG) or a call graph can be established);

Head Measurements 620: These measurements at the head of interaction are any measurements taken at the head of interaction (e.g., number of messages sent to a topic, etc.);

Tail Measurements 625: These measurements at the tail of interaction are any measurements taken at the tail of interaction (e.g., number of messages arrived at the topic, etc.);

Interaction Measurements 630: Derived or direct measurements on the interaction itself (e.g., number of messages lost on the wire, etc.);

Interaction Context 635: Context entities that might appear in different interactions that would allow a very specific kind of grouping (e.g., a business transaction ID, VLAN ID, etc.); and Arbitrary Properties 640: Any arbitrary properties that annotate the interaction with further information.

When the above interaction object 600 is implemented in a monitoring platform, such as the illustrative application intelligence platform above (or any other suitable monitoring platform), the system works as described below.

Figure 7A:
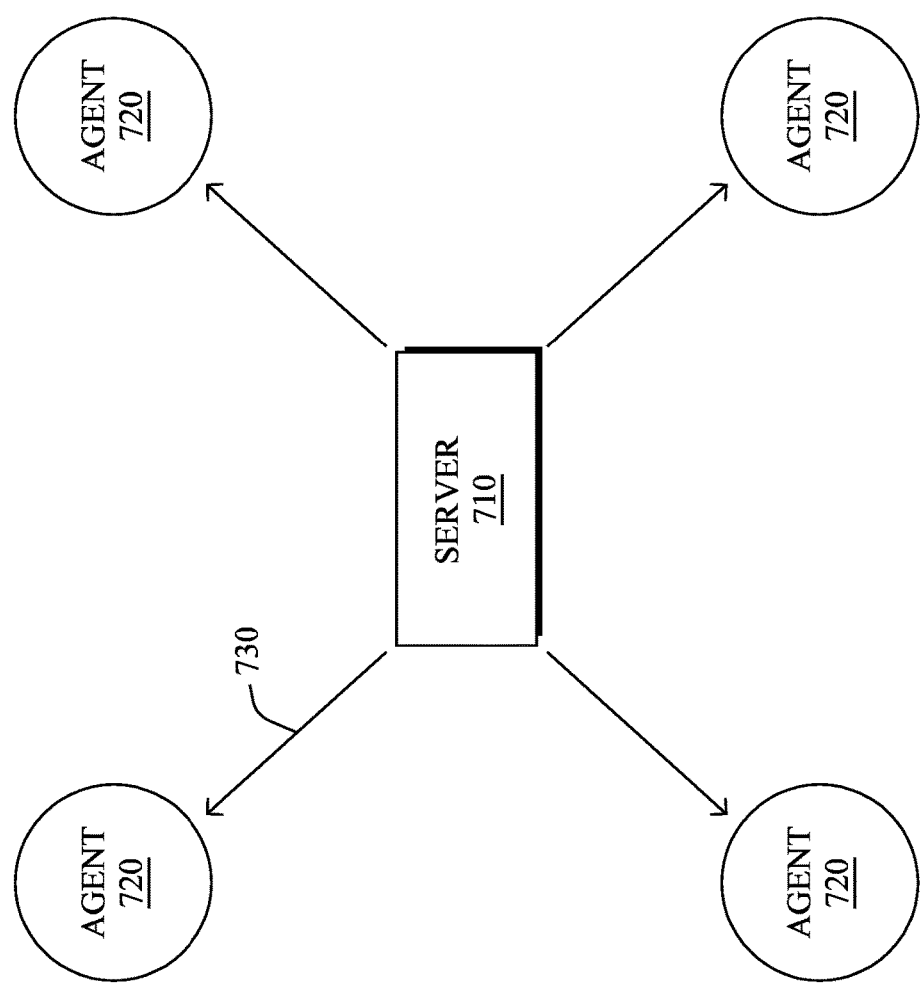
FIGS. 7A-7C illustrate an example of interaction monitoring in accordance with one or more embodiments described herein.

First, with reference to environment 700 of FIG. 7A, a domain (e.g., a team that is control of a particular type of agent or a particular type of application) that wants to monitor a specific type of interaction define the "type of interaction" and declare (or register) it in the platform, such as at server/controller 710. This type would contain at least the type of entities at the head and tail, and optionally the type of upstream interaction, type of measurements at head and tail, and the type of context entities. It may also include any arbitrary information to be collected as well. The type of interaction may be distributed among monitoring agents 720 within the domain (environment 700), such as through an instructional message 730.

Figure 7B:
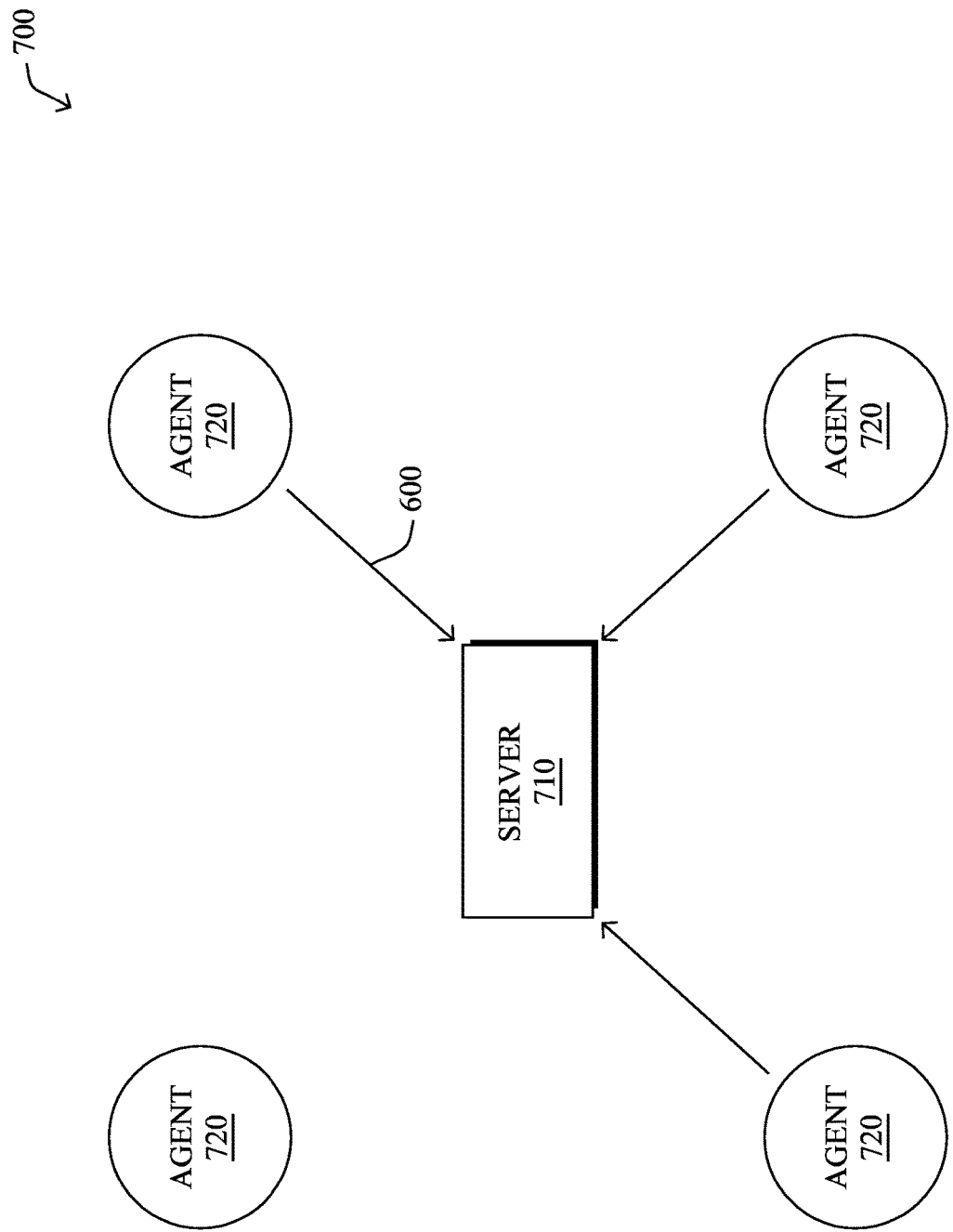

Next, and with reference to FIG. 7B, during the course of monitoring, an agent 720 may detect an instance that matches the type defined above (e.g., a type of head, a type of tail, a type of upstream instance, and/or a type of context, in any singular or grouped combination). As such, the agent may then send notice of the interaction instance, such as in an interaction object 600, to the platform (e.g., to server/controller 710), notifying the platform of the interaction. Note that at this time, the notification may simply initiate the recordation of an instance (e.g., identifying the instance components, such as the head, tail, upstream, context, etc.), or else may additionally include various metrics and/or properties.

Figure 7C:
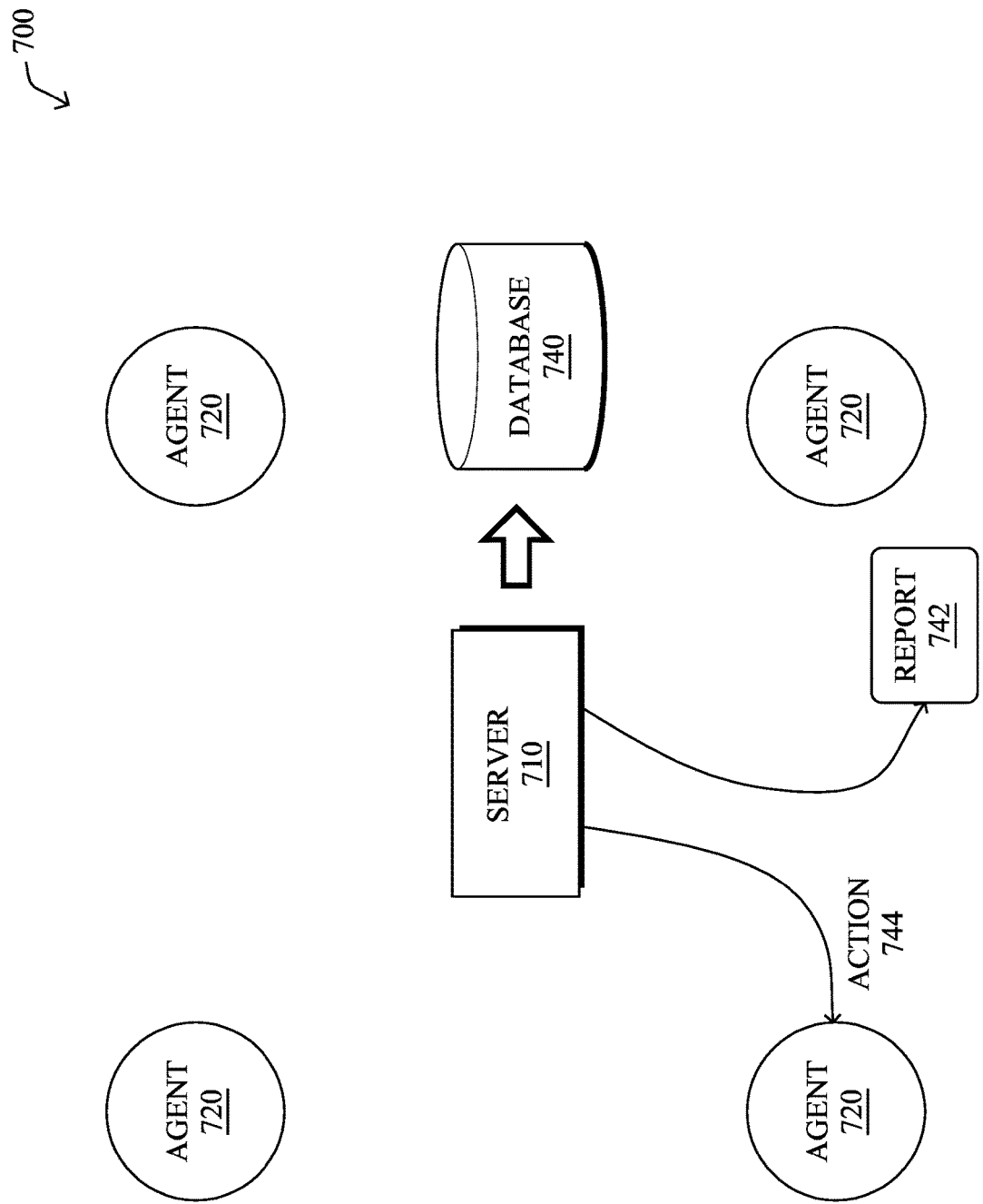

Now, with reference to FIG. 7C, the platform (e.g., server/controller 710) receives and saves the interaction in a database 740, such as by setting up correct indexes, setting up relationships between data elements, and so on. Once interactions are stored in database 740, various reports 742 and/or actions 744 may be generated based on the stored interactions, and, as described below, based on the metrics measured from such interactions, accordingly. Illustratively, storage of the interactions in the database in this manner enables the following illustrative examples to be possible, among others:

Querying for interactions that pertain to a particular entity, e.g., when it is a head, when it is a tail, what contexts are associated with the entity, etc.;

Grouping the interactions (and the metrics, below) based on head, tail, context etc. (e.g., now an interaction between a REST endpoint and a topic may be grouped to service-topic, restendpoint-messagequeue, datacenter-topic, datacenter-messagequeue, etc.); and Determining/Following interaction paths (e.g., for doing root cause analysis, comparing and contrasting different interaction paths going through entities, etc.).

Figure 8:
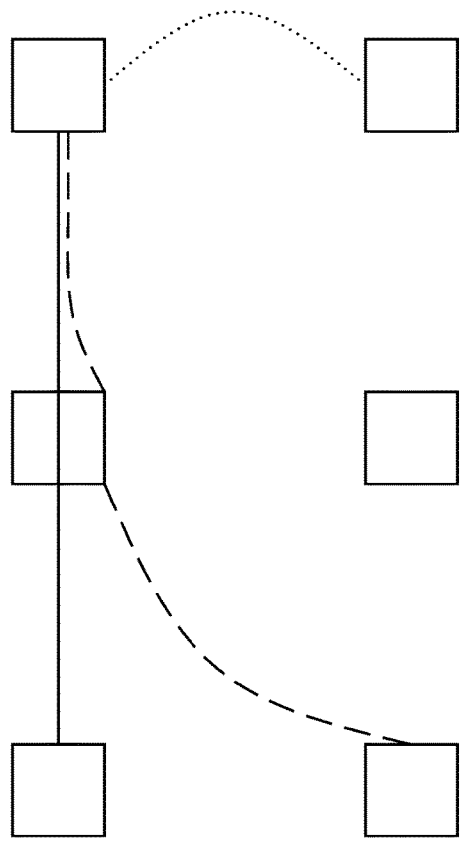
FIG. 8 illustrates an example of interaction paths in accordance with one or more embodiments described herein.
Figure 8:
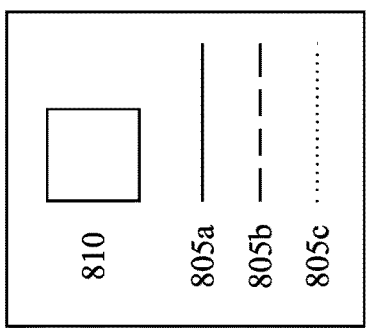

Regarding interaction paths, FIG. 8, as an example, illustrates a simplified environment 800 of how different paths 805 (e.g., 805a, b, c) can be created between a number of entities 810 (e.g., upstream interactions, heads, tails, and so on). Note that though certain paths may be established and generally maintained for all similar interactions (e.g., a collection of interactions of a same path from a same upstream interaction, to a same head device, to the same tail device), other factors may create different interaction paths between the devices for interactions, such as load balancing similar interactions across different devices or other reasons. By connecting the entities of the interactions, these paths 805 can be traced end-to-end, queried, used for metrics/measurements (e.g., path-based end-to-end metrics, path establishment and utilization metrics, etc.), and so on.

Returning to FIG. 7B, the agents 720 can send (or continue to send) metrics they collect at the heads and tails of the interactions to the platform server/controller 710 in interaction objects 600. Then, again returning to FIG. 7C, in addition to the capabilities mentioned above, the platform can now also aggregate and associate metrics based on the interaction metadata stored in database 740.

In particular, with regard to aggregating and grouping interactions (as well as collapsing and/or expanding interactions), one or more embodiments herein enable the grouping and collapsing of interactions into any desired grouping, such as logical groupings (e.g., combining measurements from lower-order entities and/or interactions into higher-order-entity-based measurements for corresponding higher-order entities and/or interactions), as well as user-defined groupings (e.g., particular heads out of a plurality of known heads, particular combinations of certain heads to certain tails, and so on). As an example, assume that a REST resource is sending a message to a topic partition. As per the design in the earlier section, the basic interaction is restresource-topicpartition. Now, the same interaction may also be thought of as an interaction between higher order entities of the head and/or tail of the interaction. That is, the interaction restresource-topicpartition may also be thought of as service-topic interaction or restresource-messagequeue interaction and so on.

Figure 9A:
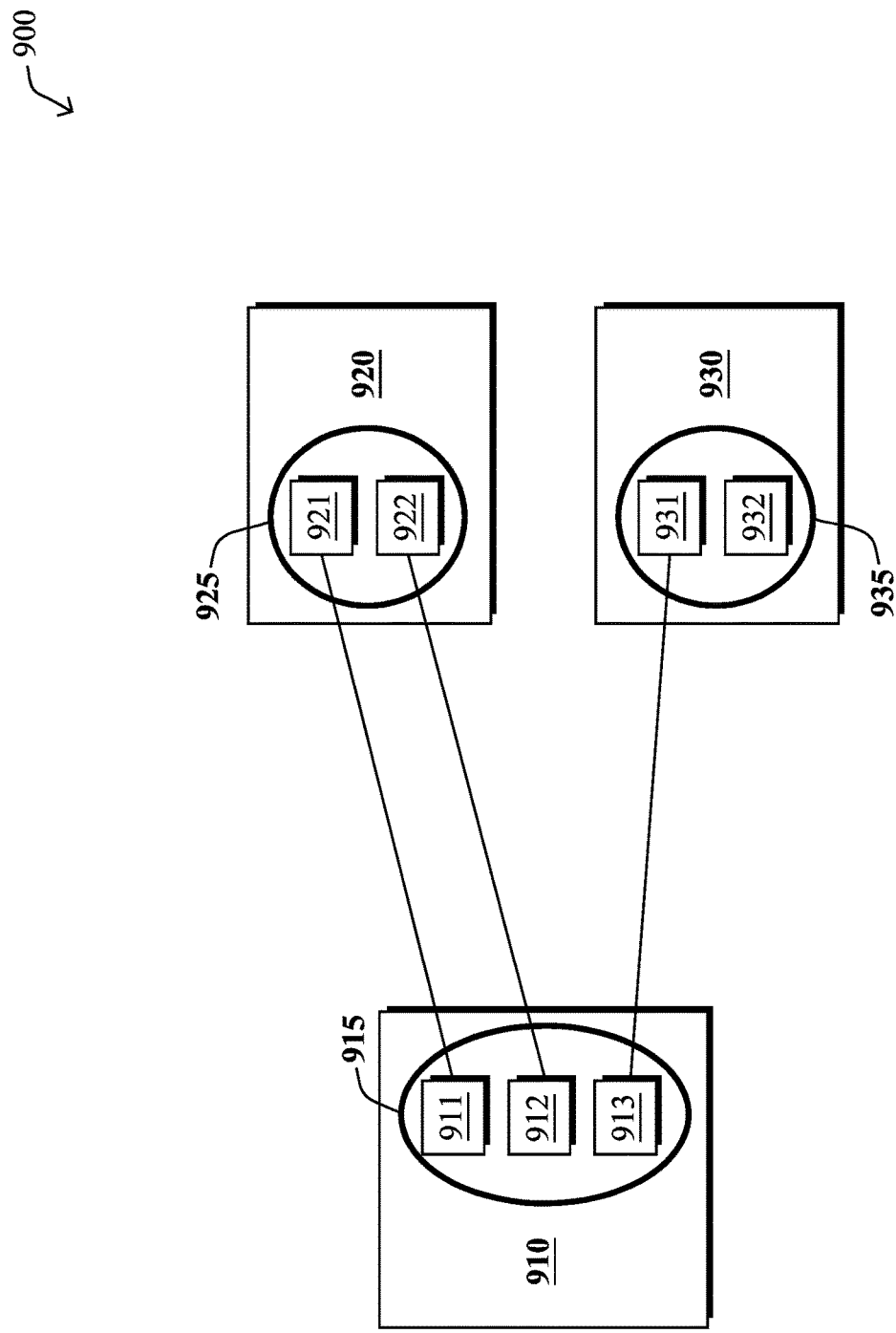
FIGS. 9A-9B illustrate an example of groupings in accordance with one or more embodiments described herein.

As another simplified example of grouping, FIG. 9A illustrates an example 900 of a head entity 910, such as a network device (e.g., server, router, load balancer, etc.), and two tail entities 920 and 930, also network devices. On each device is shown a number of ports (e.g., ports 911, 912, and 913 on device 910, ports 921 and 922 on device 920, and ports 931 and 932 on device 930). According to the techniques herein, measurements may be taken per individual port, per port-to-port connections (e.g., 911-921, 911-931, etc.), or, when grouped, as both individual ports and as a group of ports per device (e.g., grouping 915 on device 910, which may be considered a grouping of ports, or alternatively as simply all of the head entity 910). Similar groupings may occur on tail device 920 (group 925) and tail device 930 (group 935).

Figure 9B:
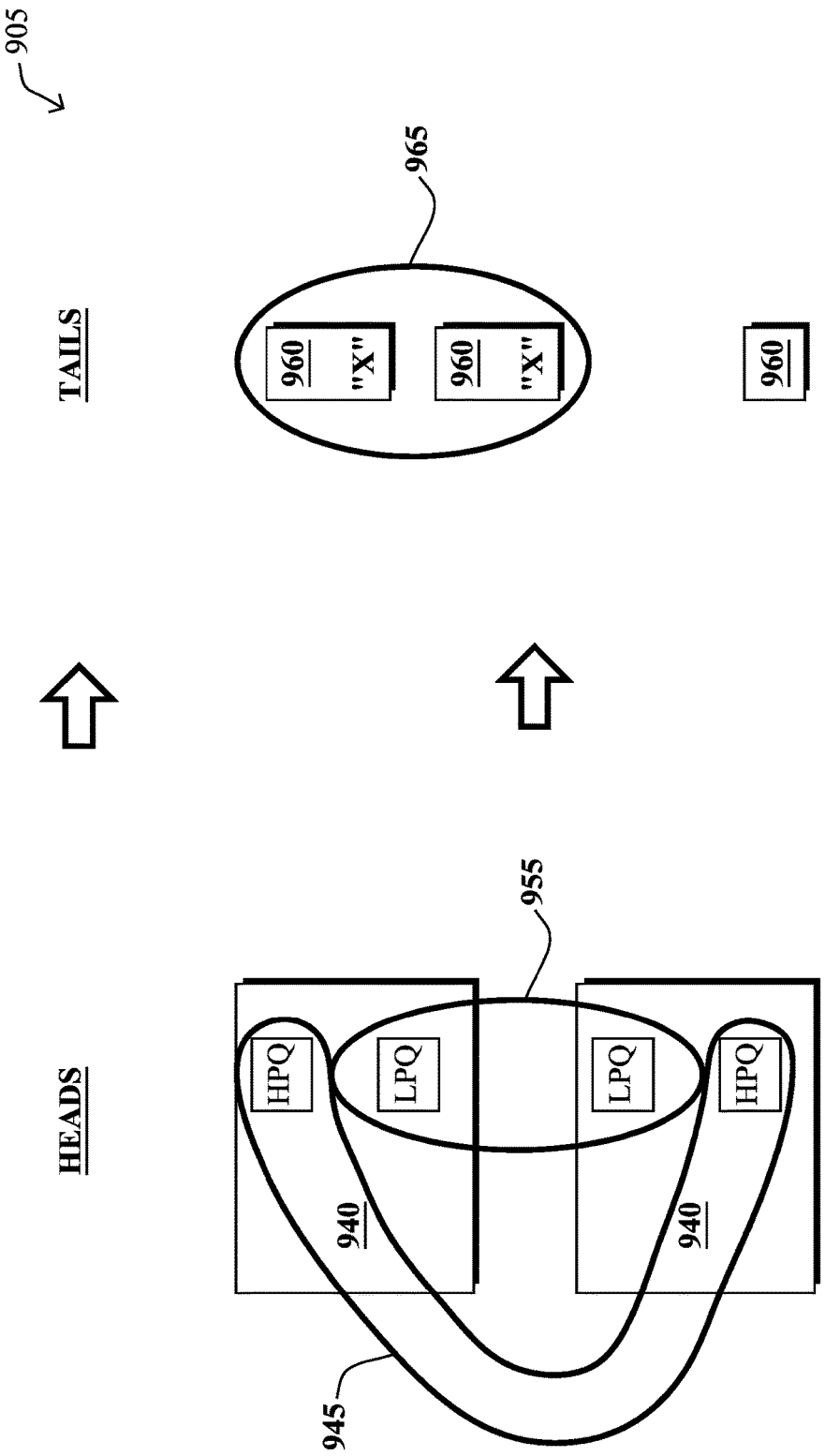

FIG. 9B, on the other hand, illustrates how, as another example 905, other types of groupings may be made that are not limited to being contained within a particular entity or even a particular type of entity, such as all high-priority queues (HPQ) across all head devices 940 as one group 945, all low-priority queues (LPQ) across all head devices 940 as another group 955, all interactions from high- or low-priority queues to any tail device 960 of type X (group 965), and so on.

Figure 10:
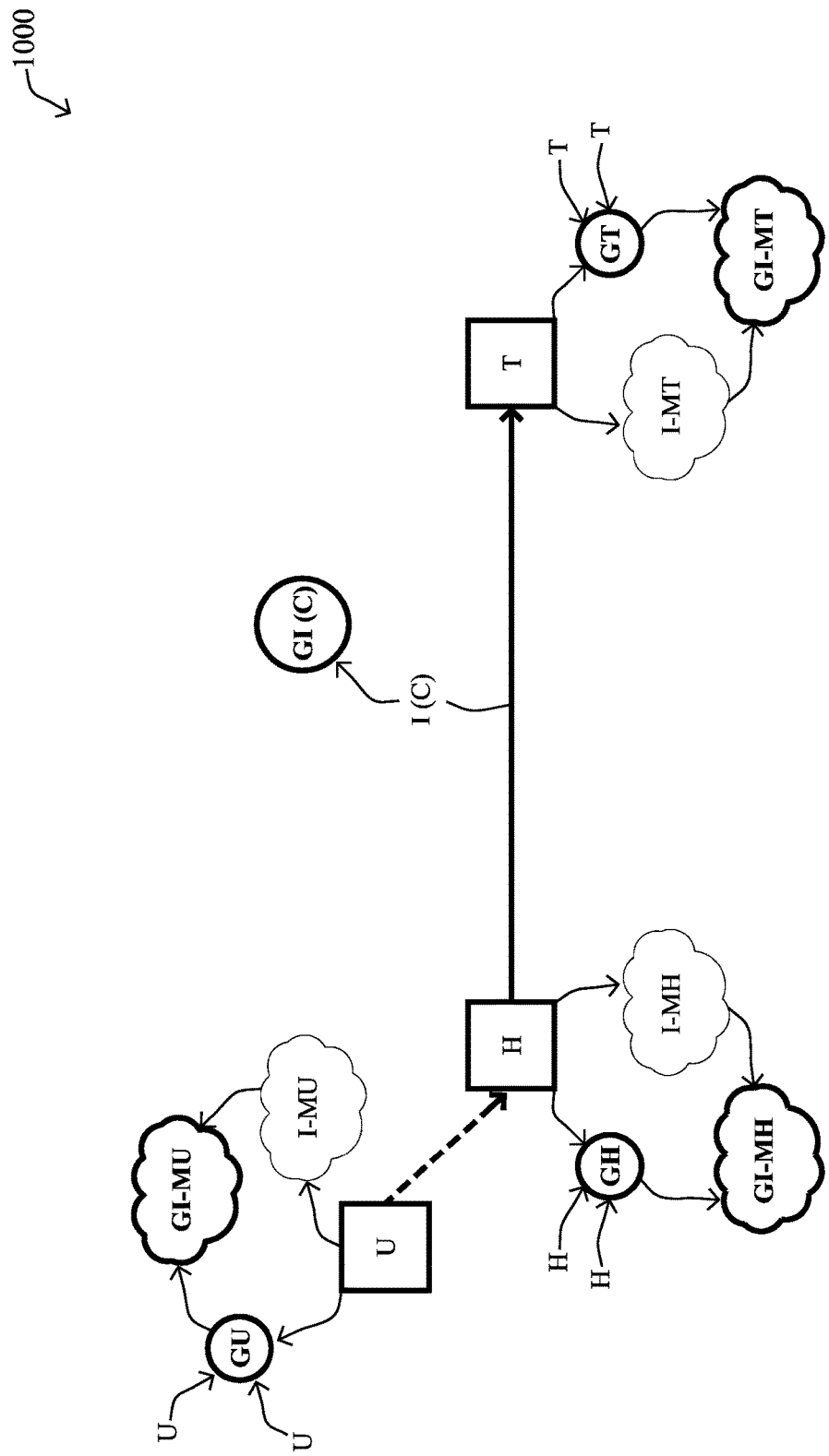
FIG. 10 illustrates an example of a grouping topology in accordance with one or more embodiments described herein.

According to one or more embodiments of the present disclosure, in order to achieve these sorts of groupings, the techniques herein may perform as follows, with reference generally to illustration 1000 of FIG. 10. Assume, for example, that there is an interaction type "I" between the head entity of type "H" and the tail entity of type "T" with a context of type "C". It also has metrics of type "I-MH" and metrics of type "I-MT" at the head and tail respectively. Assume that there is a grouped interaction type GI between the head entity of type GH and tail entity of type GT with the context of type C. It also has a set of metrics of types GI-MH and GI-MT at head and tail respectively. Other groups, such as GU for upstream instances of type U, may also be established and tracked for metrics of types I-MU and grouped metrics GI-MU. (Note that it is not necessary that all elements of GI have to be "grouped" objects, and the illustration is merely an example.)

Now, when an interaction i1 between h1 and t1 is received at the platform with c1 as the context, the following logic may be executed:

1. For the entity h1 at the head of the interaction, find its group entity gh1. Similarly, find gt1 and gc1 for t1 and c1 as well.
2. For ui1, which is the upstream interaction of i1, find its grouped interaction ugi1.
3. Create an interaction gi1 between gh1 and gt1 with context as gc1 and upstream as ugi1.

Accordingly, when the metrics for i1 arrive at the platform (server/controller), it will copy the metrics to the head or tail of gi1 as defined by the metric types GI-MH and GI-MT. Similar procedures can be used to collapse the interactions as well, as may readily be appreciated by those skilled in the art.

As described above, therefore, the techniques herein may then use the individual and/or grouped metrics to generate reports and displays, or may perform actions, such as operation adjustments (e.g., load balancing, server spin-up, etc.), attack mitigation (e.g., detecting and mitigating denial of service (DoS) attacks), and so on.

Note that in addition to context entities as described above, the techniques herein may also apply to "sub-contexts" as well. For example, a context may be a particular type of business transaction, but a sub-context may apply to sub-transactions. For example, when initiating a bank transfer (a business transaction context), there is a debit transaction at the sender's bank (a sub-transaction, sub-context), and a credit transaction at the recipient's bank (another sub-context). As such, the path/metrics of the context (the entire transfer) as well as the paths/metrics of each individual sub-context may be maintained according to the techniques herein. (Note that the bank transfer is merely one example context with possible sub-contexts, and any sub-context may be defined, such as particular servers, particular times of day, particular application versions, and so on.)

Figure 11A:
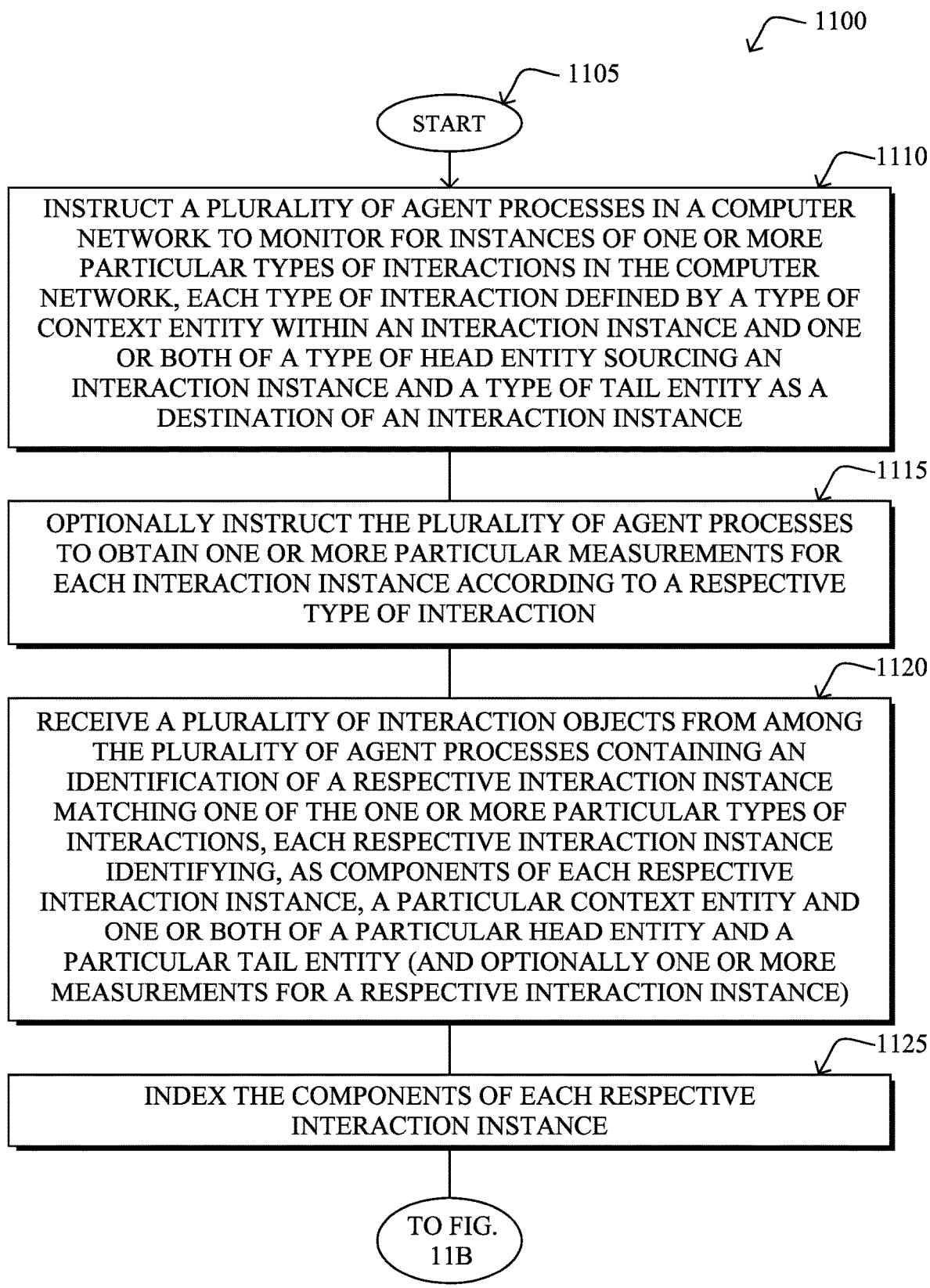
FIGS. 11A-11B illustrate an example simplified procedure for monitoring interactions between entities in accordance with one or more embodiments described herein, particularly from the perspective of a controller.
Figure 11B:
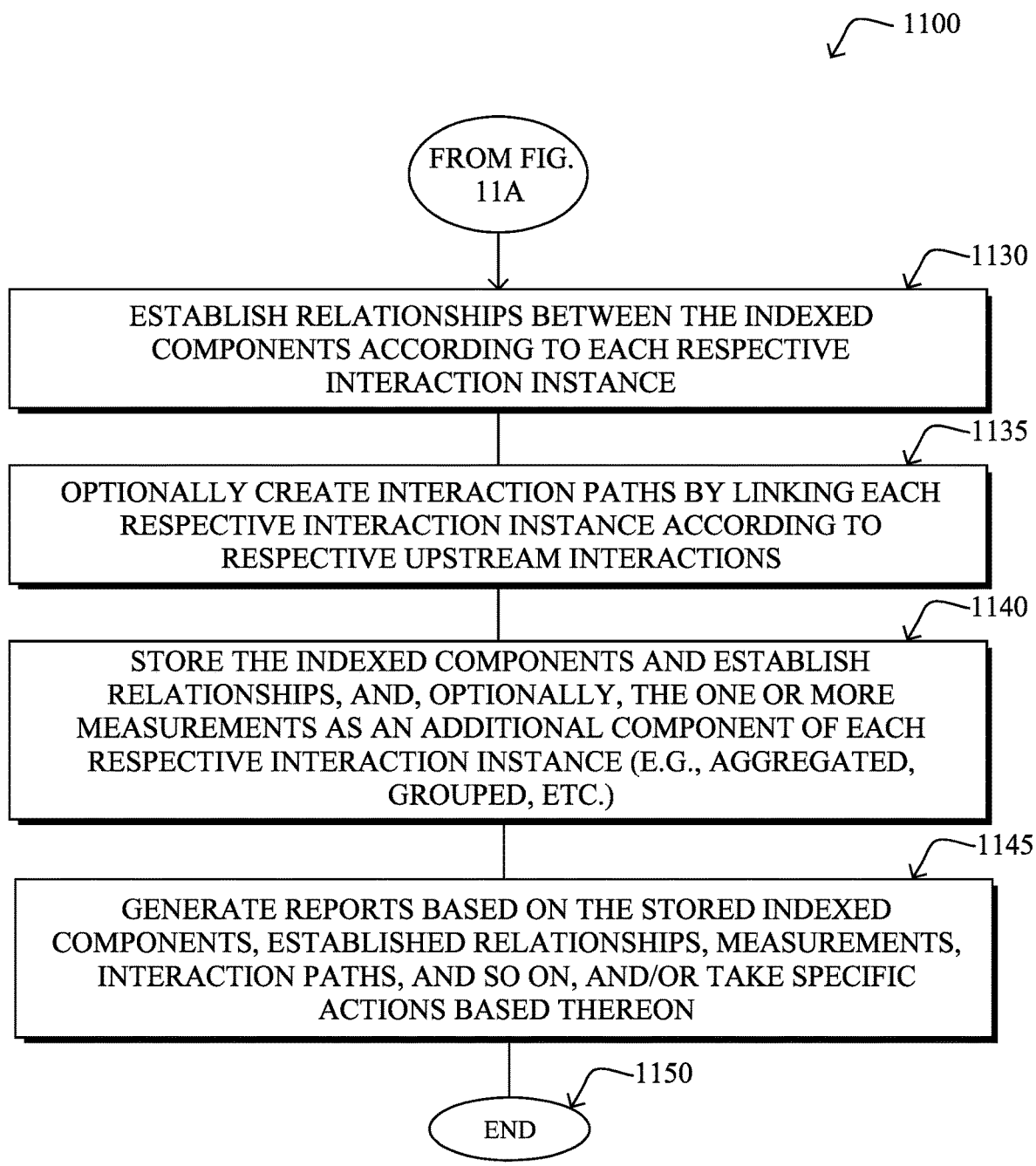

FIGS. 11A-11B illustrate an example simplified procedure for monitoring interactions between entities in accordance with one or more embodiments described herein, particularly from the perspective of a controller. For example, a non-generic, specifically configured device (e.g., device 200, such as a server) may perform procedure 1100 by executing stored instructions (e.g., process 248, such as a controller process). The procedure 1100 may start at step 1105, and continues to step 1110, where, as described in greater detail above, a server/controller 710 instructs a plurality of agent processes 720 in a computer network to monitor for instances of one or more particular types of interactions in the computer network, each type of interaction defined at least by a type of context entity within an interaction instance and one or both of a type of head entity sourcing an interaction instance and a type of tail entity as a destination of an interaction instance. As noted above, types of interactions may also optionally be defined by a type of upstream interaction triggering an interaction instance. Note that head entities and tail entities may be any combination of (e.g., independently selected from) the following: an application entity, a network entity, a service, a resource, a device, a queue, a topic, a port, an application, a thread, a domain, and other possibilities. Example context entities, on the other hand, may comprise certain types of transactions, (e.g., a business transaction (BT), as described above), virtual local area networks (VLANs), types of communications, types of network flows, application threads, and so on.

Optionally, in step 1115 (e.g., as part of the same instructions in step 1110), the plurality of agent processes may also be instructed to obtain one or more particular measurements for each interaction instance according to a respective type of interaction (e.g., head measurements, tail measurements, interaction measurements, etc.).

In step 1120, the controller may then begin receiving a plurality of interaction objects 600 from among the plurality of agent processes, where each of the plurality of interaction objects contains an identification of a respective interaction instance matching one of the one or more particular types of interactions. In particular, each respective interaction instance identifies, as components of each respective interaction instance, a particular context entity 635 and one or both of a particular head entity 605 and a particular tail entity 610.

As mentioned above, within the received interaction objects, one or more measurements for a respective interaction instance may also be received (e.g., at this time or continued into the future as metrics are collected), such as head measurements 620, tail measurements 625, and interaction measurements 630. As also mentioned above, one or more respective interaction instances within received interaction objects may also identify, as an additional component of each respective interaction instance, a particular upstream interaction 615.

In step 1125, the controller may index the components of each respective interaction instance, and in step 1130 may establish relationships between the indexed components according to each respective interaction instance, as detailed above. In one embodiment, in step 1135 the controller may also create interaction paths 805 by linking each respective interaction instance according to respective upstream interactions (e.g., upstream entities to head entities to tail entities, and chaining them together where appropriate). The indexed components and established relationships may be stored in step 1140, along with, optionally, the one or more measurements as an additional component of each respective interaction instance. Note that as described in greater detail above, the measurements may be stored by aggregating measurements from a plurality of interaction instances according to one or more aggregation filters, and/or by grouping lower-order measurements from a plurality of interaction instances into corresponding higher-order measurements (e.g., by combining measurements from lower-order entities and/or interactions into higher-order measurements for corresponding higher-order entities and/or interactions).

According to the techniques herein, therefore, the controller may generate reports in step 1145 based on the stored indexed components, established relationships, measurements, interaction paths, and so on, and/or may take specific actions based thereon. (Actions, for example, may be such things as detecting and mitigating alarm conditions based on one or more aspects of the received interaction instances, performing root cause analysis based on the interaction paths, comparing and contrasting one or more aspects of interaction paths traversing through either or both of particular head entities and particular tail entities, and so on).

The simplified procedure 1100 may then end in step 1150. Other steps may also be included generally within procedure 1100, such as where the arbitrary data 640 is used (e.g., "annotative data points"). For example, such steps (or, more generally, such additions to steps already specifically illustrated above), may include: instructing the plurality of agent processes to process one or more particular annotative data points (arbitrary data 640) for each interaction instance according to a respective type of interaction; receiving, within the received interaction objects, one or more annotative data points for a respective interaction instance; storing the one or more annotative data points as an additional component of each respective interaction instance; and so on.

Figure 12:
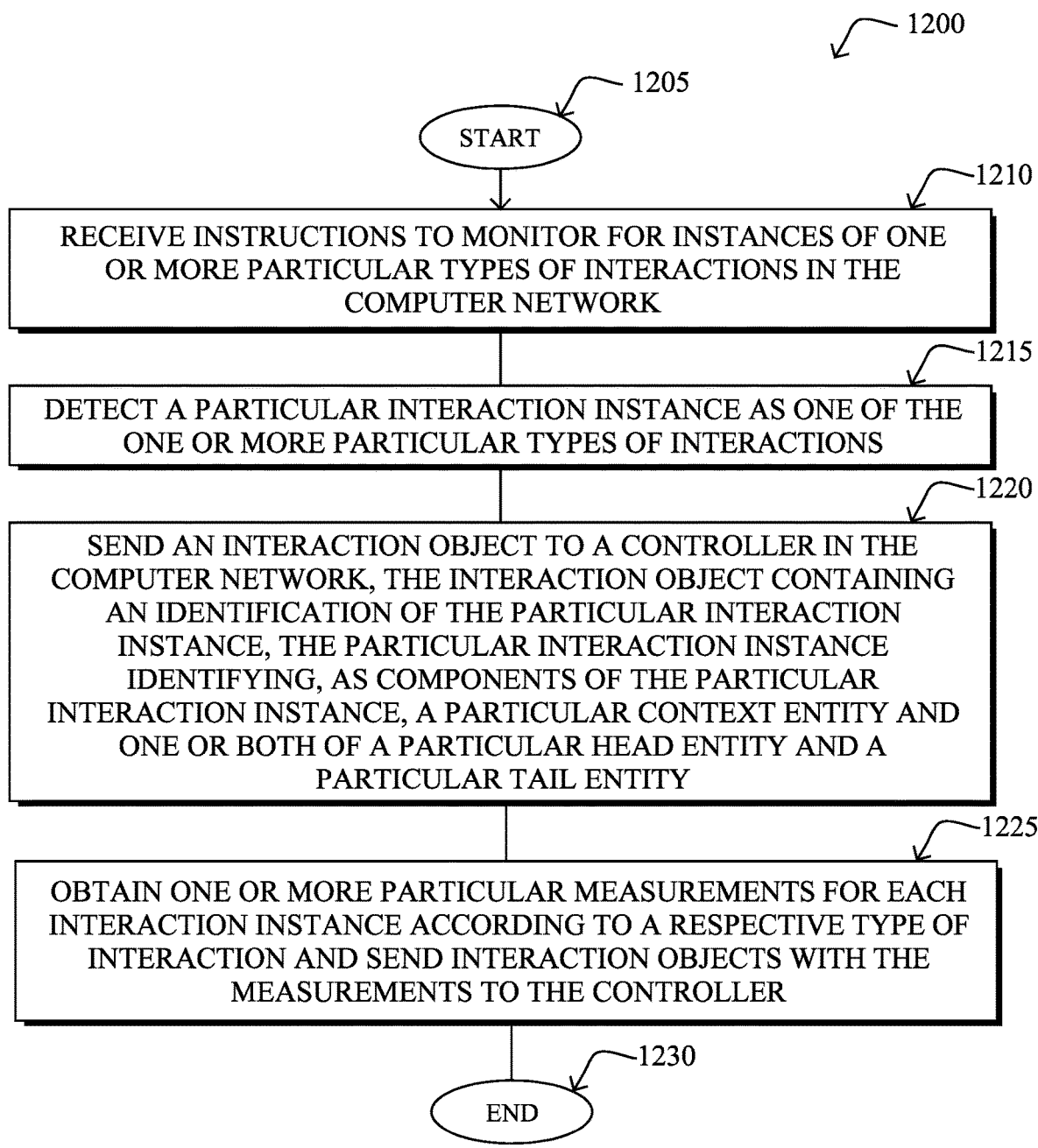
FIG. 12 illustrates another example simplified procedure for monitoring interactions between entities in accordance with one or more embodiments described herein, particularly from the perspective of an agent.

In addition, FIG. 12 illustrates another example simplified procedure for monitoring interactions between entities in accordance with one or more embodiments described herein, particularly from the perspective of an agent. For example, a non-generic, specifically configured device (e.g., device 200, such as an end device, network device, etc.) may perform procedure 1200 by executing stored instructions (e.g., process 248, e.g., an agent process). The procedure 1200 may start at step 1205, and continues to step 1210, where, as described in greater detail above, an agent process 720 in a computer network receives instructions to monitor for instances of one or more particular types of interactions in the computer network, each type of interaction defined by a type of context entity within an interaction instance and one or both of a type of head entity sourcing an interaction instance and a type of tail entity as a destination of an interaction instance. As such, upon detecting, in step 1215, a particular interaction instance as one of the one or more particular types of interactions, then in step 1220 the agent process may send an interaction object 600 to a controller 710 in the computer network. As noted above, the interaction object may contain an identification of the particular interaction instance, the particular interaction instance identifying, as components of the particular interaction instance, one or both of a particular head entity 605 and a particular tail entity 610, and optionally a particular context entity 635 (e.g., and further optionally an upstream instance 615). The controller may then be configured to index components of a plurality of interaction instances, establish relationships between the indexed components according to each respective interaction instance, store the indexed components and established relationships, and generate reports based on the stored indexed components and established relationships, etc., as mentioned above.

Note further that in certain embodiments, in step 1225, the agent process may obtain one or more particular measurements for each interaction instance according to a respective type of interaction, and may then send interaction objects 600 with the measurements (e.g., 620, 625, 630) to the controller, accordingly.

The simplified procedure 1200 may then end in step 1230, illustratively with the option to continue detecting instances, performing and sharing measurements of certain metrics, including arbitrary properties (annotative data), and so on.

It should be noted that while certain steps within procedures 1100-1200 may be optional as described above, the steps shown in FIGS. 11A-12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1100 and 1200 are described separately, certain steps from each procedure may be incorporated into each other procedure, and the procedures are not meant to be mutually exclusive.

The techniques described herein, therefore, provide for a generic way to monitor interactions between entities. In particular, the techniques herein offer an innovative way to monitor IT OPs infrastructure, enabling cross-cutting capabilities like root cause analysis, AIOPs, and alerting to make use of the interaction data efficiently. Since an "interaction" can mean different things in different environments, including different endpoints, different contexts, and so on, the techniques herein allow for thinking of data in different ways, interpreting data at various levels of activity, and as directed by individual circumstances. In addition, the techniques herein go beyond tracking applications and business transactions, which can still be performed by the techniques herein, but provide further unlocking of available data by capturing more data from more entities on a generic "interaction basis", along with further contextual information, thus achieving greater overall value.

In still further embodiments of the techniques herein, a business impact of monitored interactions between entities can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the monitored interactions between entities with various business transactions in order to better understand the effect on the business transactions, accordingly.

Illustratively, the techniques described herein may be performed by hardware, software, and/or firmware, such as in accordance with the illustrative interaction monitoring process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   instructing, by a controller, a plurality of agent processes in a computer network to monitor for instances of one or more particular types of interactions in the computer network, each type of interaction defined by a type of context entity within an interaction instance and one or both of a type of head entity sourcing an interaction instance and a type of tail entity as a destination of an interaction instance;
   receiving, at the controller, a plurality of interaction objects from among the plurality of agent processes, each of the plurality of interaction objects containing an identification of a respective interaction instance matching one of the one or more particular types of interactions, each respective interaction instance identifying, as components of each respective interaction instance, a particular context entity and one or both of a particular head entity and a particular tail entity;
   indexing, by the controller, the components of each respective interaction instance;

establishing, by the controller, relationships between the indexed components according to each respective interaction instance;

storing, by the controller, the indexed components and established relationships; and generating, by the controller, reports based on the stored indexed components and established relationships.

2. The method as in claim 1, wherein one or more types of interactions are further defined by a type of upstream interaction triggering an interaction instance.

3. The method as in claim 1, wherein one or more respective interaction instances within received interaction objects identify, as an additional component of each respective interaction instance, a particular upstream interaction, the method further comprising:

creating interaction paths by linking each respective interaction instance according to respective upstream interactions.

4. The method as in claim 3, further comprising:

performing root cause analysis based on the interaction paths.

5. The method as in claim 3, further comprising:

comparing and contrasting one or more aspects of interaction paths traversing through either or both of particular head entities and particular tail entities.

6. The method as in claim 1, further comprising:

instructing the plurality of agent processes to obtain one or more particular measurements for each interaction instance according to a respective type of interaction;

receiving, within the received interaction objects, one or more measurements for a respective interaction instance; and storing the one or more measurements as an additional component of each respective interaction instance.

7. The method as in claim 6, further comprising:

aggregating measurements from a plurality of interaction instances according to one or more aggregation filters.

8. The method as in claim 6, further comprising:

grouping lower-order measurements from a plurality of interaction instances into corresponding higher-order measurements.

9. The method as in claim 1, wherein head entities and tail entities are independently selected from a group consisting of: an application entity; and a network entity.

10. The method as in claim 1, wherein head entities and tail entities are independently selected from a group consisting of: a service; a resource; a device; a queue; a topic; a port; an application; a thread; and a domain.

11. The method as in claim 1, further comprising:

instructing the plurality of agent processes to process one or more particular annotative data points for each interaction instance according to a respective type of interaction;

receiving, within the received interaction objects, one or more annotative data points for a respective interaction instance; and storing the one or more annotative data points as an additional component of each respective interaction instance.

12. The method as in claim 1, wherein context entities are selected from a group consisting of: a transaction; a business transaction (BT); a virtual local area network (VLAN); a communication; a network flow; and an application thread.

13. The method as in claim 1, further comprising:

detecting and mitigating alarm conditions based on one or more aspects of the received interaction instances.

14. An apparatus, comprising:

one or more network interfaces to communicate with a network;

a processor coupled to the network interfaces and configured to execute one or more processes; and a memory configured to store a process executable by the processor, the process, when executed, configured to:

instruct a plurality of agent processes in a computer network to monitor for instances of one or more particular types of interactions in the computer network, each type of interaction defined by a type of context entity within an interaction instance and one or both of a type of head entity sourcing an interaction instance and a type of tail entity as a destination of an interaction instance;

receive a plurality of interaction objects from among the plurality of agent processes, each of the plurality of interaction objects containing an identification of a respective interaction instance matching one of the one or more particular types of interactions, each respective interaction instance identifying, as components of each respective interaction instance, a particular context entity and one or both of a particular head entity and a particular tail entity;

index the components of each respective interaction instance;

establish relationships between the indexed components according to each respective interaction instance;

store the indexed components and established relationships; and generate reports based on the stored indexed components and established relationships.

15. The apparatus as in claim 14, wherein one or more types of interactions are further defined by a type of upstream interaction triggering an interaction instance.

16. The apparatus as in claim 14, wherein one or more respective interaction instances within received interaction objects identify, as an additional component of each respective interaction instance, a particular upstream interaction, the process, when executed, further configured to:

creating interaction paths by linking each respective interaction instance according to respective upstream interactions.

17. The apparatus as in claim 14, wherein the process, when executed, is further configured to:

instruct the plurality of agent processes to obtain one or more particular measurements for each interaction instance according to a respective type of interaction;

receive, within the received interaction objects, one or more measurements for a respective interaction instance; and store the one or more measurements as an additional component of each respective interaction instance.

18. The apparatus as in claim 17, wherein the process, when executed, is further configured to:

aggregate measurements from a plurality of interaction instances according to one or more aggregation filters.

19. The apparatus as in claim 17, wherein the process, when executed, is further configured to:

group lower-order measurements from a plurality of interaction instances into corresponding higher-order measurements.

20. A method, comprising:

receiving, by an agent process in a computer network, instructions to monitor for instances of one or more particular types of interactions in the computer network, each type of interaction defined by a type of context entity within an interaction instance and one or both of a type of head entity sourcing an interaction instance and a type of tail entity as a destination of an interaction instance;

detecting, by the agent process, a particular interaction instance as one of the one or more particular types of interactions; and sending, by the agent process in response to detecting the particular interaction instance, an interaction object to a controller in the computer network, the interaction object containing an identification of the particular interaction instance, the particular interaction instance identifying, as components of the particular interaction instance, a particular context entity and one or both of a particular head entity and a particular tail entity;

wherein the controller is configured to index components of a plurality of interaction instances, establish relationships between the indexed components according to each respective interaction instance, store the indexed components and established relationships, and generate reports based on the stored indexed components and established relationships.

\* \* \* \* \*